(12) United States Patent
Colgren et al.

(10) Patent No.: US 7,922,115 B2
(45) Date of Patent: Apr. 12, 2011

(54) MODULAR UNMANNED AIR-VEHICLE

(76) Inventors: Richard D. Colgren, Palmdale, CA (US); Lance C. Holly, Lawrence, KS (US); William R. Donovan, Lawrence, KS (US)

(*) Notice: Subject to any disclaimer, the term of this patent is extended or adjusted under 35 U.S.C. 154(b) by 479 days.

(21) Appl. No.: 11/789,079

(22) Filed: Apr. 23, 2007

(65) Prior Publication Data

US 2008/0149758 A1    Jun. 26, 2008

(51) Int. Cl.
*B64C 1/00* (2006.01)
*B64C 3/00* (2006.01)

(52) U.S. Cl. ....... 244/13; 244/45 R; 244/120; 244/123.1

(58) Field of Classification Search ................... 244/120, 244/45 R, 13, 34 R, 35 R, 123.1
See application file for complete search history.

(56) References Cited

U.S. PATENT DOCUMENTS

| | | | | |
|---|---|---|---|---|
| 2,360,220 A | * | 10/1944 | Goldman | 273/348 |
| 2,504,422 A | * | 4/1950 | Hawkins, Jr. et al. | 244/74 |
| 3,669,385 A | * | 6/1972 | Glantz et al. | 244/13 |
| 5,035,382 A | * | 7/1991 | Lissaman et al. | 244/190 |
| 5,118,052 A | * | 6/1992 | Alvarez Calderon | 244/49 |
| 5,395,073 A | | 3/1995 | Rutan et al. | |
| 5,769,359 A | * | 6/1998 | Rutan et al. | 244/76 R |
| 5,941,478 A | | 8/1999 | Schmittle | |
| 5,975,464 A | * | 11/1999 | Rutan | 244/120 |
| 6,056,237 A | * | 5/2000 | Woodland | 244/3.15 |
| 6,070,831 A | * | 6/2000 | Vassiliev et al. | 244/120 |
| 6,615,165 B2 | | 9/2003 | Carroll | |
| 6,948,681 B2 | | 9/2005 | Stupakis | |
| 7,014,141 B2 | * | 3/2006 | Cox et al. | 244/3.11 |
| 7,234,667 B1 | * | 6/2007 | Talmage, Jr. | 244/120 |
| 7,237,750 B2 | * | 7/2007 | Chiu et al. | 244/119 |

* cited by examiner

*Primary Examiner* — Timothy D Collins
*Assistant Examiner* — Joseph W Sanderson

(57) ABSTRACT

The present invention is an unmanned air vehicle designed for reconnaissance, surveillance, data acquisition, and general research. The air vehicle is a monoplane that consists of several pieces that can easily be assembled using a minimal amount of tools. The air vehicle consists of a forward and aft fuselage section, two identical horizontal stabilizers, and four identical wing sections. The aircraft can fly with all four wing sections, or with just two wing sections (the short wing configuration). Each of the four wing sections of the air vehicle can be interchanged with any of the other wing sections for the purpose of minimizing assembly time and spare parts.

12 Claims, 3 Drawing Sheets

Isometric View of the Aircraft

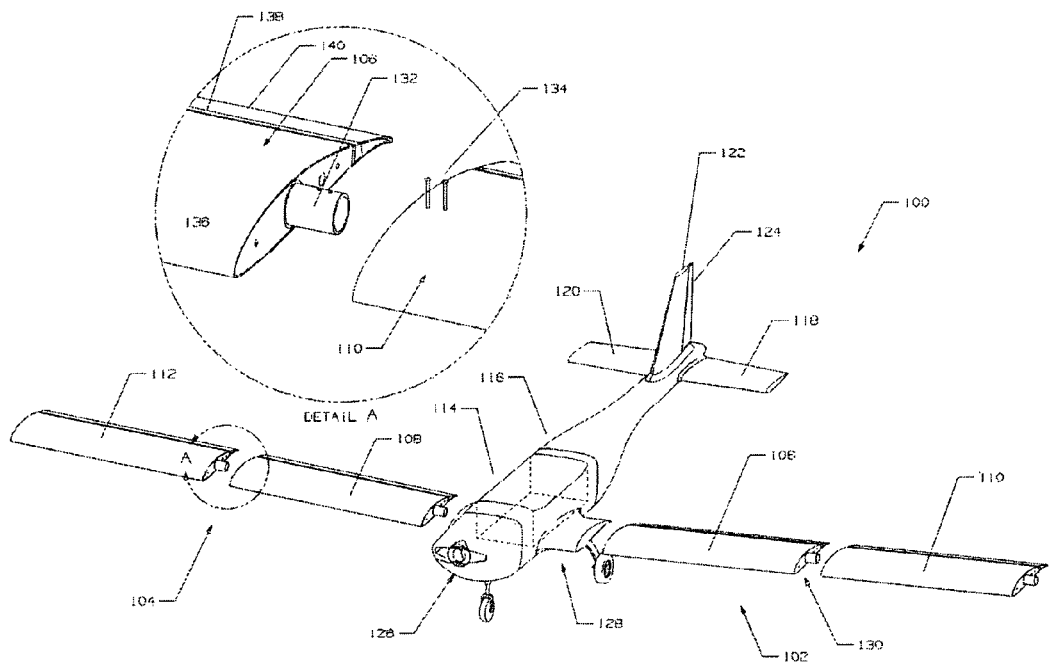
Fig. 1. Isometric View of the Aircraft
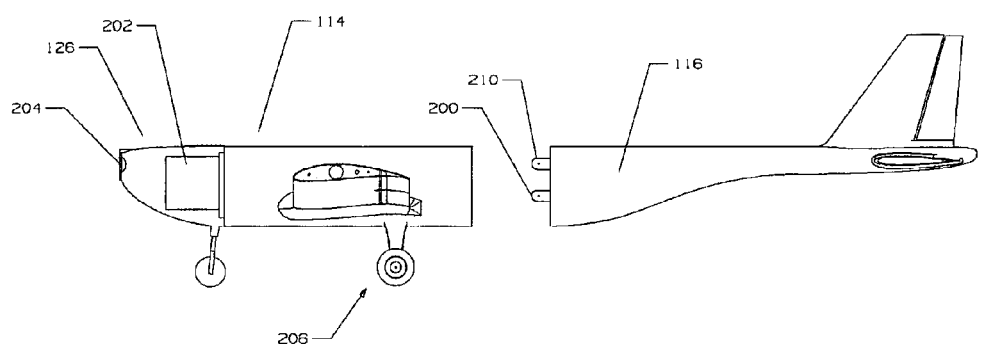
Fig. 2. Right Side View of the Aircraft

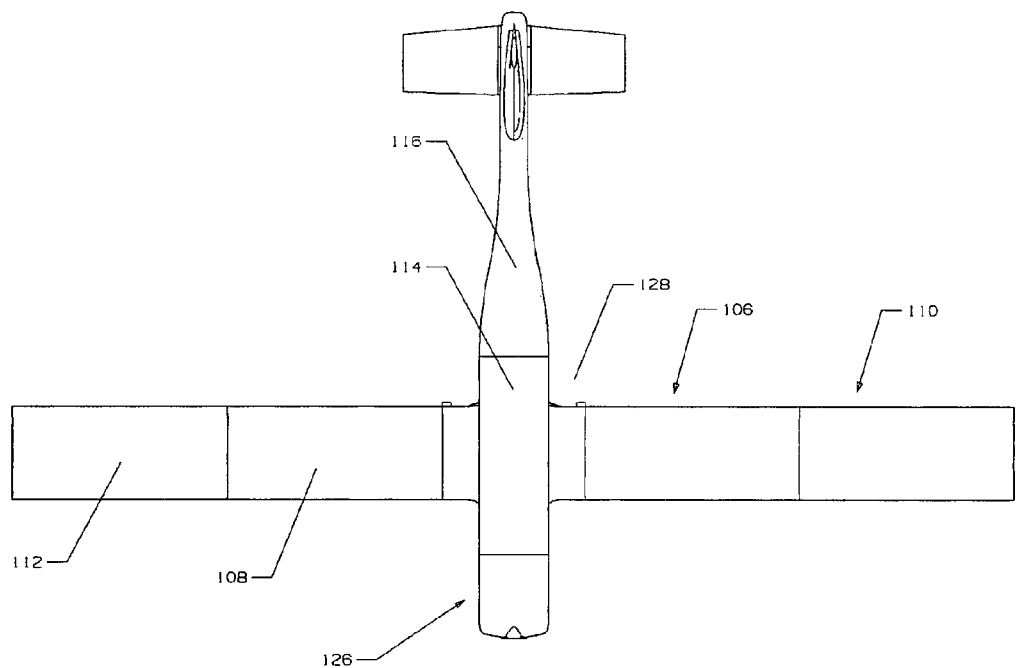
Fig. 3. Top View
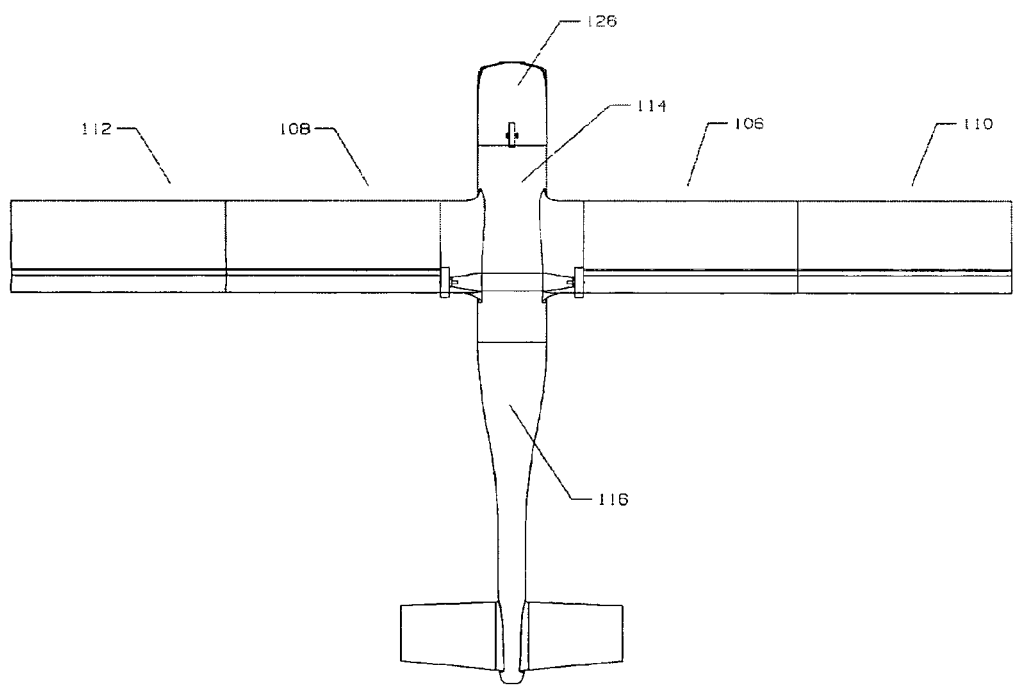
Fig. 4. Bottom View

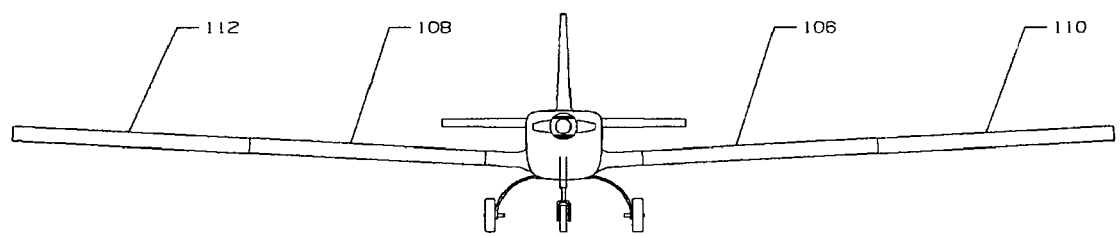
Fig. 5. Front View

MODULAR UNMANNED AIR-VEHICLE

BACKGROUND OF INVENTION

1. Field of Invention

This invention relates generally to unmanned air vehicles (UAVs) and, more particularly, to engine powered unmanned air vehicles.

2. Background Art

Unmanned air vehicles are utilized to perform various tasks such as, for example, reconnaissance and surveillance, data acquisition, and general research such as the study of weather patterns. Unmanned air vehicles can take on various forms from gas filled inflatables such as helium balloons, to gliders, to engine powered aircraft. Engine powered aircraft certainly have their advantages in that they can typically fly over and cover long ranges more quickly, fly at higher altitudes, carry heavier payloads to higher altitudes and over longer distances, can typically be controlled with greater agility over a larger flight envelope, and can typically be designed with more versatile all-weather capability.

However, engine powered unmanned air vehicles have their shortcomings. For example, engine powered unmanned vehicles are typically more difficult to stow and transport than other unmanned air vehicles such as, for example, a gas filled inflatable. Also, an engine powered air vehicle will likely have a higher initial cost to build or purchase. There is also likely a greater cost to maintain and repair, particularly in the case of the air vehicle's airframe. Further, the takeoff or launch area for the air vehicle may be limited such that some air vehicles may have problems taking off.

A more versatile engine powered unmanned air vehicle design is needed that captures the benefits of an engine powered air vehicle while overcoming the shortcomings, thus providing a more versatile and capable vehicle.

BRIEF SUMMARY OF INVENTION

The invention is a modular unmanned air vehicle designed for reconnaissance, surveillance, data acquisition, and general research. The air vehicle can be a monoplane design that is comprised of several pieces or modular components that can easily be assembled using a minimal amount of tools. The aircraft can comprise of a forward and aft fuselage section, two identical horizontal stabilizers, and four identical wing sections.

The aircraft can be designed so that it can be disassembled into several small pieces or modular components, which provides several advantages. First, the modular design makes transporting the aircraft much easier because it can be disassembled into its modular components for ease of stowing and transporting. Second, if the aircraft incurs any local damage to one or more of the modular components, the damaged part can simply be replaced rather than repaired. This decreases the life-cycle cost of the aircraft, as repairing fiberglass can be a difficult and costly process. Lastly, this can allow the user to fly the aircraft with all four wing sections (the long wing configuration) or with just two wing sections (the short wing configuration). This makes the aircraft usable for missions requiring short takeoff and landing and high endurance (long wing), or missions requiring higher speed and range (short wing).

Another aspect of the present invention is the wings are identical such that the four wing sections can be assembled in any order. This decreases the number of spare parts required for repair in the case of damage.

The usable payload bay can be designed to be capable of carrying two standard-volume-weight boxes, which is much more than the capacity of a typical UAV of this size. Also, the hatch for the payload bay can be designed to be extremely large, which allows easy access to, and loading of, the payload bay. This can be accomplished by designing the substructure so that the load that is received when the payload is loaded through the top of the fuselage can be transferred down to the sides of the fuselage.

The aircraft can be designed with a very long engine mount, which can extend the engine well beyond the firewall. This can be done so that the aircraft can accommodate several different engines. Also, if a heavier engine is used, then the length of the engine mount could be modified so the center of gravity of the aircraft remains the same. This is also a unique feature of this design.

The horizontal tail can be designed as an all moving control surface so that the aircraft can easily be controlled in both configurations—long and short wing. Although not unique, this is unusual and provides a unique capability for this configuration.

These and other advantageous features of the present invention will be in part apparent and in part pointed out herein.

BRIEF DESCRIPTION OF THE DRAWINGS

For a better understanding of the present invention, reference may be made to the accompanying drawings in which:

FIG. 1 is a partially exploded isometric view of an unmanned air vehicle;

FIG. 1 contains an isometric view of the joint for the wing sections;

FIG. 2 is a side view of the unmanned vehicle;

FIG. 3 is a top plan view of the unmanned vehicle;

FIG. 4 is a bottom plan view of the unmanned vehicle; and

FIG. 5 is a front view of the unmanned vehicle.

DETAILED DESCRIPTION OF INVENTION

According to the embodiment(s) of the present invention, various views are illustrated in FIGS. 1-5 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention comprising a monoplane airframe including various modular components including modular wing sections and forward and aft fuselage sections figures a novel apparatus for a modular unmanned vehicle.

The details of the invention and various embodiments can be better understood by referring to the figures of the drawing. Referring to FIG. 1, a partially exploded isometric view of an unmanned air vehicle is shown. The modular structure of the airframe is illustrated by this exploded view. The modular airframe 100 includes a left modular wing 102 and a right modular wing 104. Each of the modular wings, 102 and 104, each comprise primary wing sections 106 and 108 and extension wing sections 110 and 112. Modular sections 102 and 104 of the wing are utilized without the extensions for the short wing configuration of the UAV. The modular airframe structure also includes forward and aft fuselage sections 114 and 116 respectively. The aft fuselage section 116 includes left and right all moving horizontal tail wings 118 and 120.

The entire wing surface of the tail wing can act as a moving control surface to allow for better maneuverability when utilizing the short wing configuration. The aft fuselage also includes a vertical stabilizer 122 having a rear vertical aileron 124.

However, unlike the horizontal tail wings 118 and 120, the left and right modular wings include the left and right primary ailerons and the left and right extended ailerons. The ailerons or control surfaces for the left and right wings can be designed such that the upper skin of the wing is utilized as a hinge for the controlled surface or the aileron. This design increases the effectiveness of the control surface while minimizing the effect the control surface has on the overall aerodynamics of the wing, namely drag. The upper skin of the wing is utilized as a hinge for the control surface. This design provides for a seamless upper wing surface which increases the lift to drag ratio of the wing.

The control surfaces can be controlled or manipulated with hydraulics or other appropriate systems such as, for example, electrical and/or electromechanical systems.

Therefore, the wing and the control surface are manufactured in one piece. A given modular wing section such as wing section 106 is interchangeable with all other wing sections as indicated as 108, 110 and 112. End cap pieces (not shown) can also be installed on the end of the wing for aesthetic purposes.

The forward fuselage section 114 includes a payload bay that is capable of carrying various items of greater capacity than what is typically carried by unmanned air vehicles of the same size. The hatch for the payload bay can be designed such that it is extremely large, allowing for easy access and loading and unloading of the payload bay. The payload bay can be designed with a substructure so that the load can go through the top of the forward fuselage and lowered down into the fuselage payload bay. A nose section 126 can be mounted forward of the forward fuselage. The nose section can have a propeller operably and rotatably mounted thereto and a front landing gear. The forward fuselage can have a wing mount 128 attached to the lower portion of its side. The primary wing section is mounted to the wing mount 128. The extension portion of wing 110 can then be mounted to the primary section 106 by the wing joint interface 130.

The wing joint interface 130 is further detailed in FIG. 1 which shows a mounting shaft 132 extending from the primary wing section 106 which is inserted through a receptacle within the wing section 110. The receptacle for receiving the mounting shaft 132 is not shown in this view. One or more set screws 134 can be utilized to affix the mounting shaft 132 into the receptacle of the wing extension portion 110. FIG. 1 further details the wing control surface. As can be seen from this view, the wing section 106 and the aileron section 140 can be designed to share a common and continuous upper skin 136 that is flexible such that a hinge strip 138 is formed along the juncture of the wing and the aileron. Other mounting interfaces can be utilized that do not require set screws.

Referring to FIG. 2, a side view of the unmanned vehicle is shown. This side view reveals the interface between the nose section 126 and the forward fuselage section 114. The engine mounting assembly 202 is shown mounted on the front portion of the forward fuselage 114. The nose section is mounted over the engine mounting assembly 202. A propeller can be inserted and rotatably mounted through an opening 204 of the nose section having a shaft operably connected between the propeller and the engine (not shown) mounted on the engine mounting assembly. The payload area is shown in dotted lines within the forward fuselage. The forward fuselage also has landing gear 206. The aft fuselage section 116 can be designed with mounting appendages 208 and 210 such that the forward fuselage section can be mounted to the aft fuselage section.

Referring to FIG. 3, a top plan view of the unmanned vehicle is shown. This top plan view further illustrates the modular sections of the unmanned air vehicle airframe. The airframe can be separated into its primary modular components such as, for example, the aft fuselage 116, the forward fuselage 114, the nose section 126, the left and right primary wing sections 106 and 108 and the extended wing sections 110 and 112.

The airframe can be disassembled and shipped in these separate components. The modular components can be standardized such that replacement components can be utilized if any one of the modular components fail or are damaged during use or shipment. Further, each of the wing sections 106, 108, 110 and 112 can all be interchangeable. This modular design can also allow a user to have multiple forward fuselages where each fuselage is configured differently with various different electronic components such as various surveillance equipment. A user can have multiple pre-configured fuselage sections with preinstalled payloads while only having one set of the other modular components, such as the wing sections and the nose and aft fuselage sections.

Referring to FIG. 4, a bottom plan view of the unmanned vehicle is shown. This bottom plan view illustrates the position of the forward and aft landing gear. As shown, the aft landing gear can be designed such that the width of the aft landing gear does not extend beyond the width of the left and right wing mounts. The landing gear can be designed to be fixed and non-retractable as shown. The modular aircraft can be configured such that only the primary left and right wing sections are installed which can be referred to as the short wing configuration. The short wing configuration makes the aircraft usable for missions requiring higher speed and shorter range. When all four wing sections are installed, which can be referred to as the long wing configuration, the aircraft is usable for missions requiring short takeoff and landing and high endurance.

Referring to FIG. 5, a front view of the unmanned vehicle is shown. This front view illustrates the position of the tail wings relative to the primary wings. This view also reveals a slight upward cantation of the left and right wings. The position of the propeller mounting is further illustrated in this frontal view.

The unmanned air vehicle could be designed to be equipped with a typical transceiver for remotely transmitting control signals from the ground to control and maneuver the air vehicle from the ground. Another alternative is to have an on-board computerized control system that can be preprogrammed with a flight pattern that executes the flight pattern.

The unmanned air vehicle can be powered by a combustion engine typical for the size of the air vehicle and payload capacity. Other power sources could also be utilized such as, for example, an electric motor. The airframe could be constructed of a light weight material typical for such an air vehicle, such as, for example, fiberglass or a light weight alloy or carbon fiber. The size of the overall air vehicle can also vary as well as the size of the modular sections, such as the size of the modular wing sections.

The various modular unmanned vehicle design examples shown illustrate a novel apparatus that solves many of the shortcomings of engine powered unmanned air vehicles. A user of the present invention may choose any of the above unmanned air vehicle embodiments, or an equivalent thereof, depending upon the desired application. In this regard, it is recognized that various forms of the subject modular unmanned air vehicle could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. An unmanned aircraft comprising:
main wings comprising two or four identical wing sections, wherein the wing sections are interchangeable from the left side of the aircraft to the right side and vice versa, and
wherein each wing section comprises a male connector on one spanwise distal end and a female connector on an opposing spanwise distal end, the connectors configured to connect to either a wing mount or adjacent wing section.

2. The unmanned aircraft according to claim 1, further comprising left and right primary ailerons on corresponding left and right wing sections of the two or four wing sections.

3. The unmanned aircraft according to claim 1, wherein the aircraft has four identical wing sections, and further comprising left and right primary ailerons on corresponding left and right inboard wing sections of the four wing sections, and left and right extended ailerons on corresponding left and right outboard wing sections of the four sections.

4. The unmanned aircraft according to claim 1, wherein the aircraft has four identical wing sections, the wing sections being interchangeable between inboard and outboard positions.

5. An unmanned aircraft comprising:
main wings comprising two or four identical wing sections, wherein the wing sections are interchangeable from the left side of the aircraft to the right side and vice versa; and
left and right wing mounts, one of said wing mounts having a male connector for connecting to one of said wing sections, and the other of said wing mounts having a female connector for connecting to another of said wing sections.

6. The unmanned aircraft according to claim 5, further comprising left and right primary ailerons on corresponding left and right wing sections of the two or four wing sections.

7. The unmanned aircraft according to claim 5, wherein the aircraft has four identical wing sections, and further comprising left and right primary ailerons on corresponding left and right inboard wing sections of the four wing sections, and left and right extended ailerons on corresponding left and right outboard wing sections of the four sections.

8. The unmanned aircraft according to claim 5, wherein the aircraft has four identical wing sections, the wing sections being interchangeable between inboard and outboard positions.

9. An unmanned air vehicle airframe having a modular design comprising:
a modular aft fuselage section having left and right horizontal tail wings, said wings movable as a control surface;
a modular forward fuselage section having a payload bay, landing gear, and an engine mounting assembly mounted thereto and removably attached to said aft fuselage;
a modular nose section mounted over said engine mounting assembly;
the engine mounting assembly capable of carrying a long engine mount, which can extend the engine well beyond the firewall;
a modular wing having two or four identical wing sections, wherein the wing sections are interchangeable from the left side of the aircraft to the right side and vice versa, and
wherein each wing section comprises a male connector on one spanwise distal end and a female connector on an opposing spanwise distal end, the connectors configured to connect to either a wing mount or adjacent wing section.

10. The unmanned aircraft according to claim 9, further comprising left and right primary ailerons on corresponding left and right wing sections of the two or four wing sections.

11. The unmanned aircraft according to claim 9, wherein the aircraft has four identical wing sections, and further comprising left and right primary ailerons on corresponding left and right inboard wing sections of the four wing sections, and left and right extended ailerons on corresponding left and right outboard wing sections of the four sections.

12. The unmanned aircraft according to claim 9, wherein the aircraft has four identical wing sections, the wing sections being interchangeable between inboard and outboard positions.

* * * * *